April 11, 1950     C. G. DAHM     2,503,904
SEISMIC PROSPECTING METHOD

Filed June 30, 1944     5 Sheets-Sheet 1

INVENTOR.
CORNELIUS G. DAHM
BY
*Sidney G. Johnson*
Attorney

April 11, 1950  C. G. DAHM  2,503,904
SEISMIC PROSPECTING METHOD
Filed June 30, 1944  5 Sheets-Sheet 2

INVENTOR.
CORNELIUS G. DAHM
BY Sidney G. Johnson
Attorney

April 11, 1950     C. G. DAHM     2,503,904

SEISMIC PROSPECTING METHOD

Filed June 30, 1944     5 Sheets-Sheet 3

INVENTOR.
CORNELIUS G. DAHM
BY
Sidney G. Johnson
Attorney

April 11, 1950     C. G. DAHM     2,503,904
SEISMIC PROSPECTING METHOD
Filed June 30, 1944     5 Sheets—Sheet 4

INVENTOR.
CORNELIUS G. DAHM
BY
Sidney C. Johnson
Attorney

April 11, 1950

C. G. DAHM 2,503,904

SEISMIC PROSPECTING METHOD

Filed June 30, 1944

INVENTOR.
CORNELIUS G. DAHM
BY
Sidney A. Johnson
Attorney

Patented Apr. 11, 1950

2,503,904

UNITED STATES PATENT OFFICE 2,503,904

SEISMIC PROSPECTING METHOD

Cornelius G. Dahm, Dallas, Tex., assignor, by mesne assignments, to Socony-Vacuum Oil Company, Incorporated, New York, N. Y., a corporation of New York Application June 30, 1944, Serial No. 543,025

3 Claims. (Cl. 181—.5)

This invention relates to seismic prospecting of the type in which seismic waves are created at a shotpoint, and the travel times of the waves and their reflections are measured at points spaced from the shotpoint along the earth's surface.

In seismic surveying systems it is necessary to take into account the upper surface of the earth, generally referred to as the weathered layer, because of the velocity of seismic waves in the weathered layer is much lower than the velocity of seismic waves in the strata, or layers beneath it. Heretofore, the velocity of the weathered layer has been determined with reasonable accuracy, and systems have been proposed by means of which account could be taken of variations in the depth of the weathered layer.

In some areas or localities, in which it is desired to conduct seismic surveys, great difficulty has been experienced in obtaining seismograms, or records, of a character sufficiently distinctive to make possible the recognition of reflections. The recognition of a reflection, and the accuracy of determining the time of arrival of the reflected waves, are both of prime importance. They are the information-factors without which the seismic surveys are worthless.

In carrying out the present invention in one form thereof, direct traveling seismic waves and their reflections have been distinctively recorded on seismograms in those areas where such records have heretofore been exceedingly obscure, and in many cases substantially useless. Some of these areas, in general, comprise a surface layer characterized by the absence of unconsolidated earth material, and the characteristics throughout its depth include uniform density and generally uniform visual characteristics. More particularly, successful seismic surveys have been conducted over areas whose surface layers comprise consolidated layers, such as limestone, hard rock and, specifically, caliche. Distinctive records were obtained by reason of the discovery of the presence, within the consolidated surface layer itself, of a zone of velocity contrast not discernible by visual inspection, by coring, or by sampling of the material from the top to the bottom of the surface layer. It was further discovered that this velocity contrast was sufficiently great to trap, within the upper low-velocity section, seismic waves. It is believed that these seismic waves, reverberating in the low-velocity section, were detected by the geophones and were the cause of the obscurement of the reflections on the seismogram.

Further, in accordance with the present invention, distinctive records were obtained over areas covered with surface caliche by the discovery and location of a velocity interface in contrast to a geological interface and by then locating each detector or geophone below the velocity interface, or in such a position that the unwanted seismic waves were attenuated or essentially absent to a degree which permitted the reflections to be detected and distinctively recorded on the seismogram.

For a more detailed explanation of the invention, and for further objects and advantages thereof, reference is to be had to the following detailed description taken in conjunction with the accompanying drawings in which:

Fig. 1 schematically illustrates, in cross-section, an area of the earth to which the invention has been applied;

Figure 1:
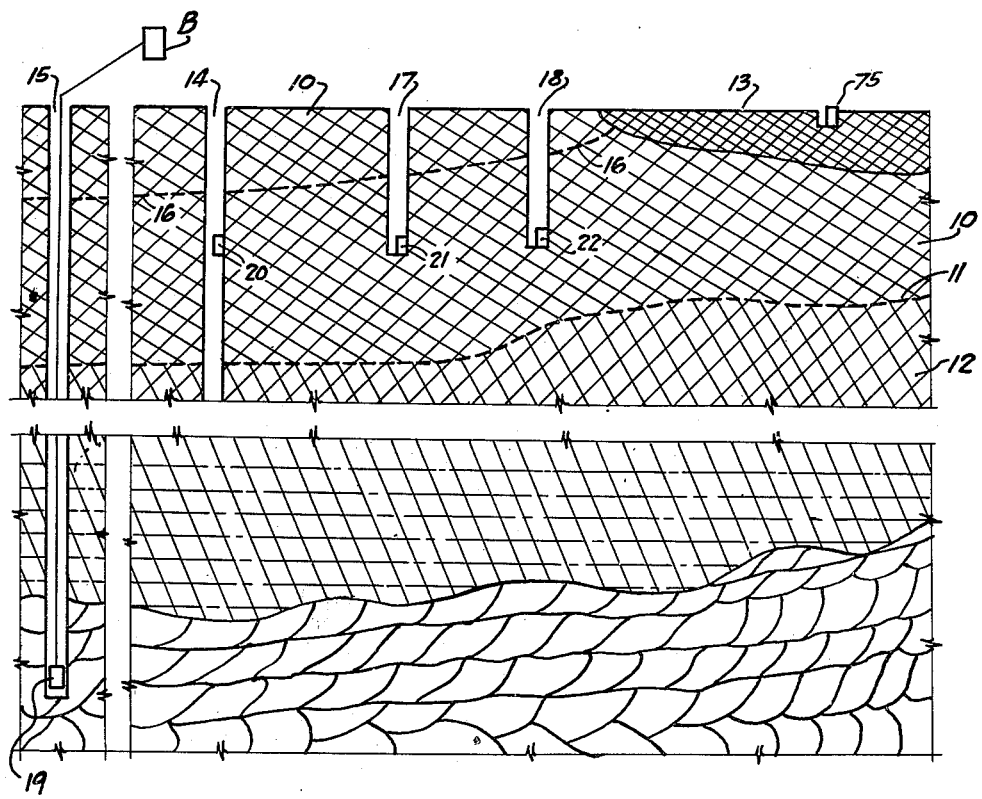
Figure 4:
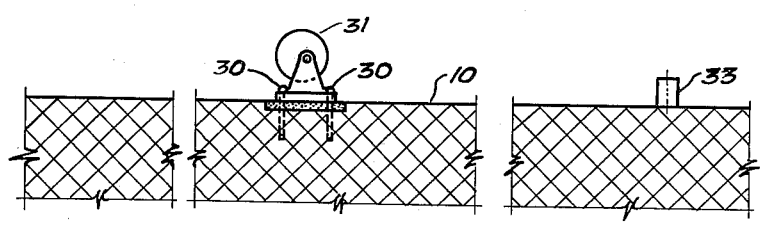
Figure 5A:
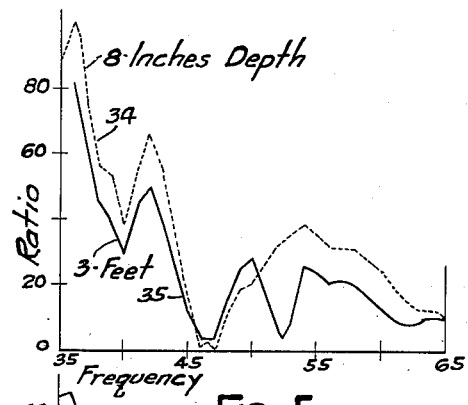
Figure 5B:
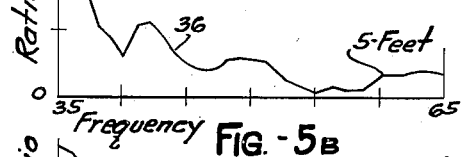
Figure 5C:
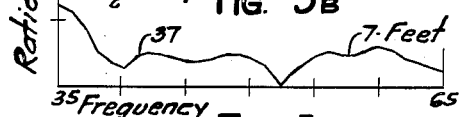
Figure 5D:
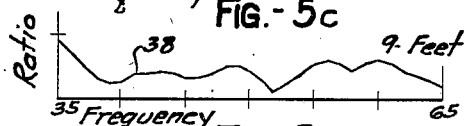
Figure 5E:
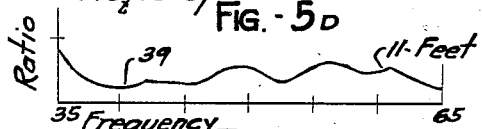
Figure 5F:
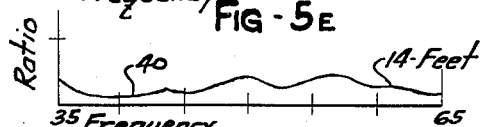
Figure 5G:
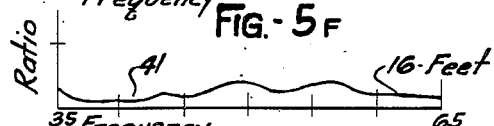
Figure 5H:
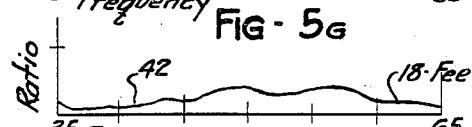
Figure 6:
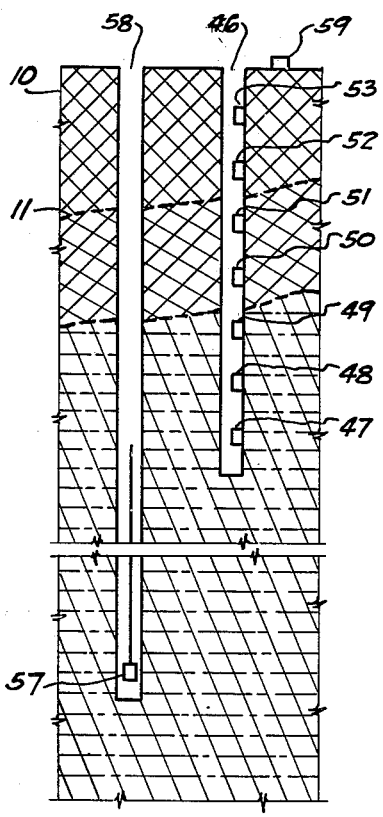
Figure 7:
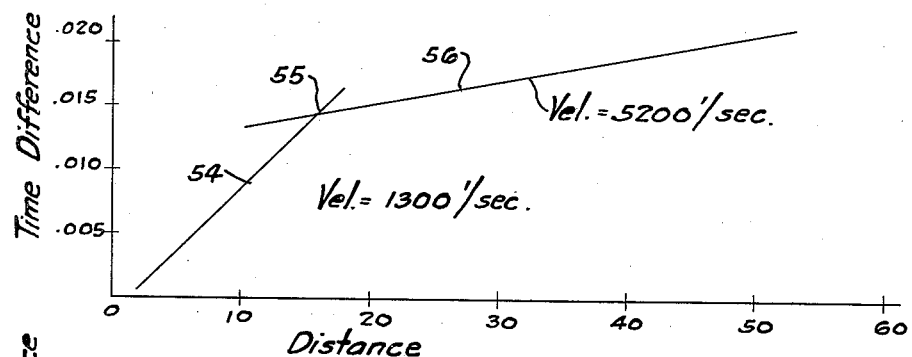
Figure 8:
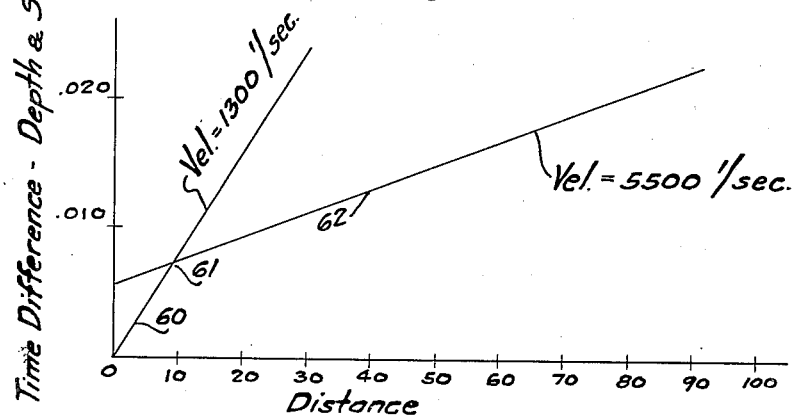
Figure 11:
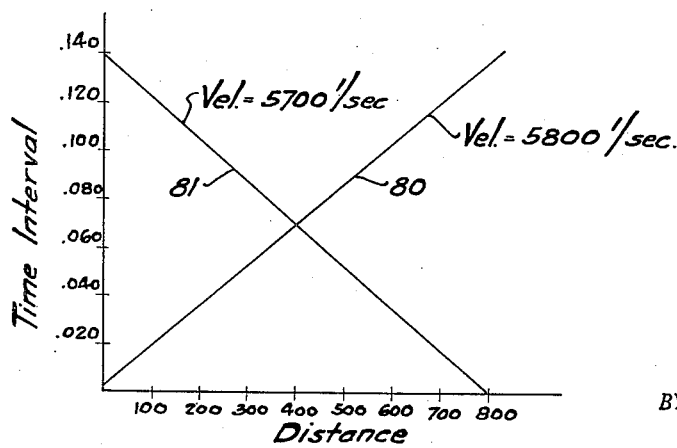

Fig. 4, partly in section, is a fractional diagrammatic view of a shaker utilized in one form of the invention;

Figs. 5A–5H are graphs illustrative of characteristics of the upper strata in the regions in which the invention has been applied;

Fig. 6 is a sectional view of a part of the surface layer illustrating the preferred form of the invention as applied to the determination of the velocity contrast;

Figs. 7, 8, 9 and 10 are graphs illustrating velocity contrasts as determined in accordance with the present invention; and Fig. 11 is a graph constructed in accordance with conventional methods to determine the near-surface velocity characteristics of the layer 10 of Fig. 1.

Referring to the drawings, the invention is shown in Fig. 1 as applied to an area of the earth's surface in which the upper layer 10 is formed of caliche. The term "caliche" as used herein refers generically to hard-rock formations such as those existing and outcropping in a large region of southwest Texas, and to other masses or layers of impure calcium carbonate deposited at or near the earth's surface in regions of arid or semi-arid climates, as by precipitation from ground waters laden with calcium bicarbonate. Such caliche may extend from or near the surface to a substantial depth, such, for example, as from 30 feet to 50 feet or more, and the layer may be of irregular thickness as indicated by the broken line 11, which marks the geological interface between the surface caliche 10 and the under layer 12, which is of visually different geological characteristics. The surface layer of caliche is, in many areas, exposed, although it sometimes is covered with a layer of earth, as indicated at 13. The caliche itself is a consolidated mass, in many respects like rock or limestone. If a hole 14 be drilled through such a layer, and samples taken throughout the depth thereof, the samples will be of the same physical characteristics down to the geological interface 11. There will be no chemical or lithologic change throughout the layer 10 which may be detected by any known method of analysis until the under layer 12 is reached.

In accordance with the present invention, it has been discovered that there exists in such caliche layer 10 a sharp velocity contrast indicated in Fig. 1 as occurring in the region of the broken line 16. It has been further discovered that the attenuation characteristics for seismic energy in the caliche above and below the zone 16 of velocity contrast are substantially identical, and represent a relatively slow absorption of this energy. This is in marked contrast with the attenuation of seismic waves during their travel through surface layers of soil, or through the unconsolidated surface layer of earth material 13. The character of the unconsolidated weathered layer has been taken into account in seismic surveys but the unusual characteristics of the consolidated layer, discovered in accordance with the present invention, have not been recognized.

The velocity contrast within the caliche has been determined in certain areas to be of the order of from one to four; that is, the velocity below the line or zone 16 is four times that of the velocity thereabove. This means, in accordance with Snell's law, that all the seismic energy which strikes from above the line, or zone 16, of discontinuity at a critical angle of incidence greater than 14½° will be totally internally reflected and will remain in the weathered layer. In consequence, when a charge of dynamite is detonated to produce seismic waves, a part of the energy travels upwardly and enters the caliche layer. A part of this energy will be reflected at the caliche-air interface at the earth's surface and will there be reflected downwardly. At the zone, or line 16, of velocity contrast all this energy in the form of seismic waves which strike this zone at greater than the critical angle will be internally reflected. In other words, the portion of the caliche 10 above the plane whose trace is the broken line 16 acts as a trap in which the disturbing waves reverberate back and forth and effectually mask weak reflections coming up from below.

Figure 2:
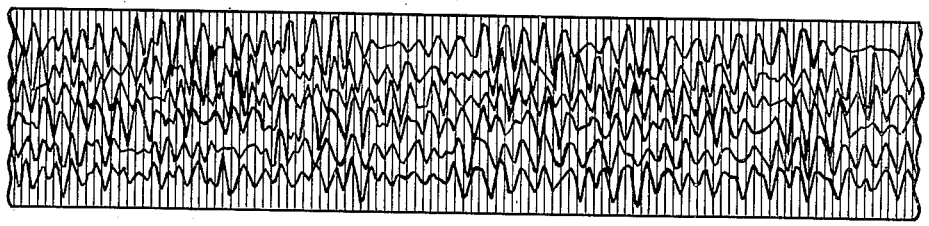
Fig. 2 is a fractional part of a seismogram taken with geophones at the surface of layer 10 of Fig. 1.

Because of the lack of sufficient attenuation characteristics, these reverberations continue throughout the time interval during which the reflections appear. This will be readily seen by referring to Fig. 2, which is a fractional part of a seismogram taken by means of geophones located directly in or on the upper part of the caliche 10. There are no reflections which may be readily identified. It may be emphasized that the fractional seismogram of Fig. 2 is representative of the better records obtained with surface or near surface geophones, and is the result of considerable experimentation with special filter circuits and other field techniques known to those skilled in the art. A typical seismogram taken in a surface-caliche area would be confused to a much greater degree than the relatively unintelligible seismogram of Fig. 2. Such a typical record has not been illustrated because of the difficulty in reproducing so many meaningless lines.

Figure 3:
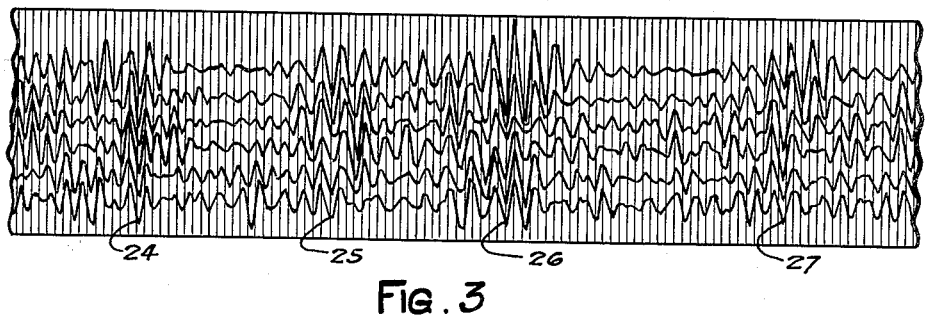
Fig. 3 is a fractional part of a seismogram taken in accordance with the present invention.

The vertical lines in both Figs. 2 and 3 represent the timing lines. The distance between the adjacent lines represents a time interval of .01 of a second. For accurate seismic surveys these records are ordinarily read to within an accuracy of 0.001 or 0.002 of a second.

In practicing the present invention in areas on which the caliche appears as a surface outcrop, a plurality of holes are drilled, three of which are indicated at 14, 17 and 18, to depths preferably below the zone of the velocity contrast. In each hole geophones, of conventional type, such as are disclosed in McCarty Patents 2,304,738 and 2,328,222 are positioned below the zone of velocity contrast and suitably arranged against the side of a hole, or otherwise disposed, to detect seismic waves. These geophones 20, 21 and 22 have been shown without lead wires, which, of course, extend upwardly from each one of them to a suitable amplifier, which is itself connected to a multi-element recording galvanometer. A shothole of substantial depth 15 is drilled a suitable distance, several hundred feet, from the spread of geophones. Seismic waves are generated by detonating a charge 19 of explosive, such as dynamite, by means of a blaster B of conventional type. For details thereof, reference may be had to Minton Patent 2,189,741 and McCarty Patent 2,160,222.

A seismogram taken in accordance with the arrangement of Fig. 1 is illustrated in Fig. 3. It will be seen that there are at least four definite reflections 24, 25, 26 and 27, which may be readily identified in Fig. 3, whereas in Fig. 2 none of these reflections may with certainty be identified. Of equal importance is the fact that each of the reflections in Fig. 3 is recorded in a distinctive manner and such that the time of their occurrence may be read with great precision, whereas in Fig. 2 if a reflection could be identified, the time at which it occurred would be to quite a substantial degree a matter of conjecture. Moreover, the seismograms of Figs. 2 and 3 were taken over the same area of the earth's surface and are disposed with record times in alinement.

The apparent impossibility of obtaining good records over surface caliche has been known for a period of years. With the conception of this invention, its practicability was then demonstrated. More particularly, as soon as it was conceived that trapped seismic energy, due to a velocity contrast near the surface might exist in the surface caliche, a series of experiments were conducted to ascertain the nature of the propagation of elastic vibrations in the caliche. As shown in Fig. 4, a ground driver or shaker was securely fastened to the caliche 10 as by the expander bolts 30. The shaker itself consisted of an eccentric rotor 31, driven by an electric motor, or other suitable means, at speeds up to 120 revolutions per second. The rotor 31 also carried an adjustable weight, not shown, mounted eccentrically. By adjusting the weight, different magnitudes of vibrations were obtained. A geophone was bolted directly to the base of the shaker and electrically connected to a galvanometer. This galvanometer, responsive to the output from this geophone, registered deflections proportional to the square of the driving frequency.

A second geophone similarly connected to a recording galvanometer was utilized to measure the amplitude of waves received at selected points spaced horizontally from the shaker. With this second geophone 33 located 46 feet from the shaker, the data represented by the graphs, Figs. 5A–5H were obtained. Each curve, to the same scale, is plotted with frequency as abscissae and a ratio as ordinates. This ratio was obtained by dividing the deflection or movement of the galvanometer connected to the geophone 33 by the amplitude or movement of the galvanometer connected to the geophone located on the shaker. In consequence, the ratio expresses the relative amplitudes of the seismic waves received at the geophone 33. With the geophone 33 eight inches below the exposed surface of the caliche 10, the data for curve 34 was obtained. The maximum value of the ratio is 100.

It will be observed that as the frequency changes from 35 cycles per second to 65 cycles per second, the relative amplitude passes through several maxima and minima but with decreasing amplitude at the higher frequency. With the geophone at a 3-foot depth, a generally similar curve 35 was obtained. The curves 36—42 show similar maxima and minima with the geophones planted or located respectively at 5, 7, 9, 11, 14, 16 and 18 feet below the surface and at the same distance from the shaker, namely 46 feet. However, in the curves 39—42, below 10 feet in depth there was a negligible difference between the maxima and minima and the value of the ratio was less than 10 for the range of frequencies utilized. The wide differences which characterize curves 34—38 have to a large degree disappeared. This indicated that the cause for the maxima and minima must be associated with the upper part of the caliche layer, namely, that portion included in the first 10 feet from the surface.

Also, similar sets of curves, plotted with the same ratio as ordinates and distance in feet from the shaker as abscissae, exhibit similar general characteristics. The pronounced maxima and minima appear, and these maxima and minima appear over a substantially wide range of frequencies, for example, between 35 cycles per second to 65 or more cycles per second.

After the foregoing observations, and further in accordance with the invention, a hole 46 was drilled some 100 feet in depth and geophones 47—53 were located at different elevations in the hole as shown in Fig. 6.

An arrangement was provided independently to hold each geophone tightly against the wall of the hole at the selected depth. Though any suitable means may be used for this purpose, the preferred arrangement forms the subject matter of a co-pending application, Serial No. 543,036, now Patent No. 2,428,168 to George B. Loper.

The shaker 31 was then located on the surface near hole 46 and operated to produce seismic waves having a constant frequency of 45 cycles per second. By plotting in feet the shortest distance from the shaker to each of geophones 47—53, as abscissae, and the phase or time difference in seconds between the wave at a geophone located at the surface, and the wave at each geophone within the hole, the graph of Fig. 7 was obtained. The straight line curve 54 has a slope which is indicative of a phase velocity of 1310 feet per second. However, at a depth of approximately 16 feet a sharp phase velocity contrast is indicated, as at 55, the point of intersection of a second straight line curve 56 with the curve 54. For depths below approximately 16 feet, the phase velocity was found by this method to be around 5200 feet per second. In drilling the hole in which the geophones were located, no visual differences in characteristics or in resistance to drilling were noted. Visually the caliche above and below the critical 16-foot depth seemed to be identical.

Instead of utilizing the shaker, and in accordance with the preferred form of the invention, a charge 57 of explosive is located at the bottom of a shothole 58, Fig. 6. After detonation thereof, there is measured the travel time of the seismic waves to the geophones 47—53 located at different distances below the surface of the earth. This method yields the group velocity in contradistinction with the phase velocity obtained from the shaker tests and illustrated in Fig. 7. In such a system, the uphole or surface geophone 59 is utilized to measure the transit time from the bottom of the shothole 58 to the surface. The transit time to each geophone is subtracted from that determined by geophone 59. The shortest differences in time will be for locations of the geophones nearer the surface. The difference in travel time increases for the geophones located at greater distance from the surface. By plotting these differences as ordinates with distances of each of geophones 47—53 from the surface, as abscissae, as in Fig. 8, a graph is obtained very similar in character to that obtained by the shaker method and as reproduced in Fig. 7.

A sharp velocity contrast is apparent at 61, the point of intersection of the straight line curve 60 and straight line curve 62. The velocity in the upper part of the surface layer of caliche is 1300 feet per second whereas the velocity in the lower part of the surface caliche is 5500 feet per second.

Because of the great velocity contrast, of the order of 1 to 4, seismic energy direct from the shot explosion is trapped in the upper zone which, as already pointed out, is characterized by low attenuation characteristics. These direct seismic waves, or the energy, arriving at the surface are reflected downwardly and upon striking the velocity interface or discontinuity from above at an angle of incidence greater than a predetermined angle, are totally and internally reflected, and because of the low attenuation factor remain in the low velocity zone with substantially undiminished amplitude during the time a photographic recordation is being obtained. Energy traveling upwardly from the shot 57 which enters the near surface zone at an angle less than the critical angle is reflected at the caliche-air interface at the surface. If, in the critical zone, the surface and the velocity discontinuity 11, are parallel with each other, the reflected energy will strike the discontinuity at an angle less than the critical angle and some of it will be reflected back into the upper zone and the remainder will be transmitted into the subsurface material. If the velocity interface 11, however, is not parallel to the surface, then a portion of the seismic waves will strike the discontinuity at an angle greater than the critical angle and will be totally and internally reflected. This is the condition most frequently encountered in the field. It is, therefore, evident that the upper zone bounded by the sharp velocity discontinuity 11 and the sharp velocity contrast between it and the air acts as a trap in which the disturbing waves, in the frequency range of the desired reflections, reverberate back and forth and effectually mask and obscure the reflections coming up from below. This masking effect is so great that no seismic surveys had been successfully conducted, in many of these surface-caliche areas, until the completion of the present invention. Variable depth of shotholes, variable geophone spacing, various grouping of geophones, and amplifiers having substantially differing frequency characteristics, were all tried out without success. However, as already shown, in accordance with the present invention, highly satisfactory seismic records have been obtained.

From studies which have been briefly indicated by the foregoing, and further in accordance with the invention, the preferred method of practicing the invention is as follows. A shothole 58, Fig. 6, is drilled to a substantial depth, of the order of 120 feet to 200 feet. At a short distance from the shothole, say 15 feet or 20 feet, a hole 46 is drilled to a depth of 50 feet to 100 feet. At regularly spaced intervals geophones 47—53 are located firmly against the side wall of the hole. An uphole geophone 59 is located at the surface. A charge 57 of dynamite is placed at the bottom of the shothole 58 and tamped with a head of water in the usual manner. Each geophone is connected to an amplifier and to an element of a recording galvanometer. By locating the charge of dynamite approximately 100 feet below the lowermost geophone 47, the first breaks and the amplitudes of the first waves arriving at each of geophones 47—53 and 59 are of substantially the same order of magnitude. The result is greater accuracy in ascertaining the times of arrival of the first waves.

Figure 9:
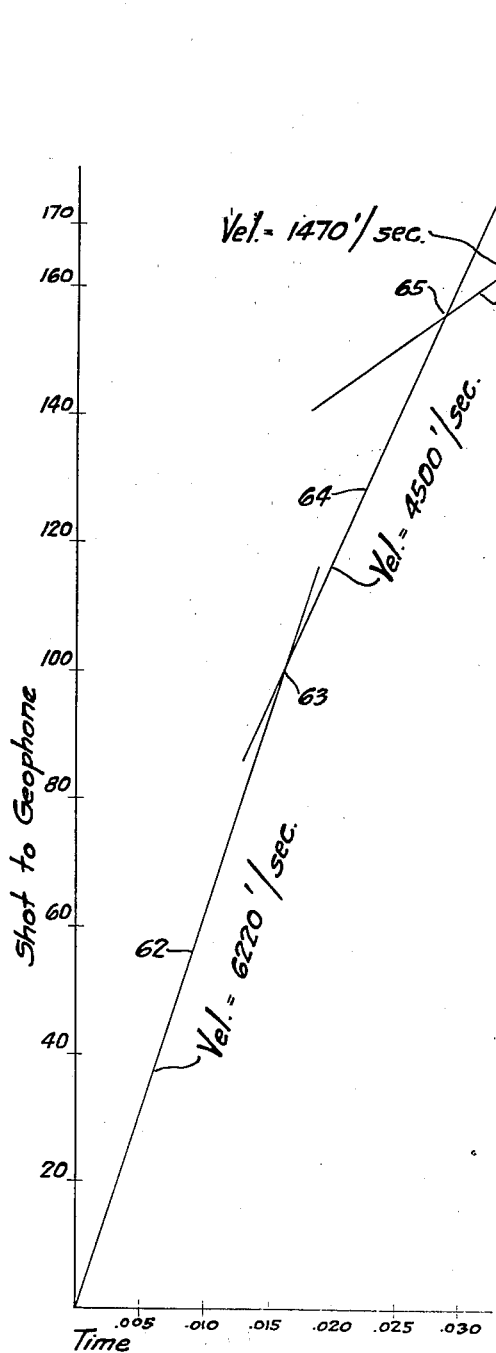
Figure 10:
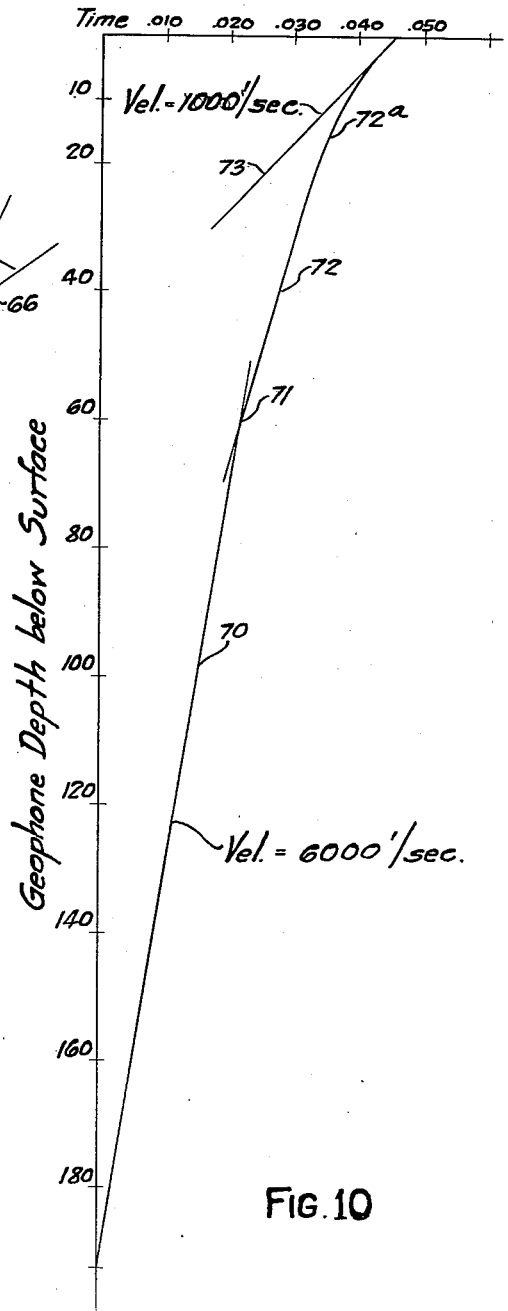

The charge is then detonated and the times of first arrival of seismic waves at the respective geophones are determined. The velocity graph, such as shown in Fig. 9, is then plotted, with travel time in seconds plotted as abscissae against the shortest distance in feet from the shotpoint to the respective geophones 47—53 and 59 as ordinates. While more geophones may be utilized than the seven which have been illustrated within the hole 46, these are indicative of the method involved. The curve 62 is a straight line indicating a substantially constant velocity up to the point 63. For distances farther from the shot than 100 feet, a different velocity is indicated by the curve 64. Inasmuch as the time of travel is plotted as abscissae against distance as ordinates it will be understood the slope of the respective curves 62 and 64 represents the velocity. At the point 65 there is an abrupt change in velocity, as indicated by the third straight line curve 66. This velocity was calculated to be 1470 feet per second in contrast with a velocity of 4500 feet per second for curve 64, and a velocity of 6220 feet per second for the curve 62. The sharp break indicated at 65 occurs in the neighborhood of 10 feet below the surface and the velocity contrast shown in Fig. 9 is about 3 to 1.

When the velocity in this surface zone was determined in conventional manner, as shown in Fig. 11, no zone of velocity contrast appeared to be present. Corrections made in accordance with this prior art method increase the errors inherent in trying to interpret relatively obscure seismograms. This prior art method is well understood and briefly consists of recording the first breaks of a spread of geophones with a shot detonated first on one side of the spread and then on the other. As shown, the times of the first breaks (after the shot instant) are plotted as ordinates against distance in feet from the shotpoint in feet. The slope of the straight line curve 80 shows a velocity of 5800 feet per second while the slope of straight line curve 81 shows a velocity of 5700 feet per second. Each curve serves as a check on the other. In neither curve 80 nor 81 is there a suggestion of a velocity contrast.

Notwithstanding the failure of the prior art methods, it may be mentioned again that the sharp velocity contrast adjacent the surface is particularly pronounced where there is an outcropping of caliche whereas where there is a surface layer of soil, the sharp velocity contrast is not so apparent. The effect of the unconsolidated surface layers of earth may be readily seen by reference to Fig. 10 where a survey was conducted in an area where the surface comprised a layer of clay to a depth of around 3 feet and from 3 feet to 35 feet caliche streaks with interbedded layers of clay. For greater depths, caliche and sand, and caliche and clay were present in differing degrees. With the surface layer of clay, it will be observed that the curve 70 indicates a high velocity of around 6000 feet per second at the greater depths, and while there is a small break at 71, the velocity is only slightly lower as indicated by the curve 72. Instead of a sharp break near the surface, the curve 72 shows a gradual transition in velocity which is represented by the smooth curve indicated at 72a. A line 73 tangent to this curve would indicate a velocity of 1000 feet per second at the immediate surface. Notwithstanding this wide difference, the fact is that where the transition is gradual, good seismic records are obtained when the detectors are placed at or near the surface, whereas, where there is a sharp break as indicated at 65, Fig. 9, readable seismic records are not obtainable when the detectors were similarly located. The layer of unconsolidated earth 13, Fig. 1, has a high attenuation characteristic which rapidly reduces any remnant of trapped energy to values which do not mask and obscure the desired reflections which are to be recorded.

It follows, that for areas having both surface layers of dirt and exposed caliche, it is only necessary to determine the location of the velocity contrast in the low-attenuating exposed caliche and to drill holes therein for geophones or detecting stations at or preferably below the zone of such velocity contrast. In accordance with the invention a minimum of holes of minimum depth need be drilled. They are only drilled to a depth where the signal to noise ratio is high enough to insure recordation of distinctive records. This signal to noise ratio increases rapidly below the zone of low velocity, so that at a suitable depth the masking effect of the trapped energy is sufficiently reduced to permit recordation of clearly defined seismic waves reflected from subsurface horizons.

Where there is an upper layer of dirt or an unconsolidated layer having usually a high attenuation characteristic, the geophones may be located at the surface, as indicated by the surface geophone 75, Fig. 1, which forms part of a spread of geophones. Hence, it will be seen that a minimum of additional drilling is necessary in order to practice the invention. Moreover, with the geophones or detecting stations located below the zone in which the disturbing seismic energy is trapped, interference therefrom is avoided. Seismic waves detected at stations below such zones are recorded in correlation with time and seismic waves detected by stations located on or near the surface where there is a mantle of unconsolidated material are also recorded in correlation with time, particularly from the instant of generation of the seismic waves. The two records, from the two types of spread environment, that is, the stations below and the stations along the surface, may then be correlated inasmuch as adequate information will be available as to the characteristics of the area in which the seismic survey is being conducted.

Further in accordance with the invention, whenever the consolidated layer is encountered, whether it be of caliche, hardpan, limestone, sandstone, limonite or peat, which offers low attenuation to seismic disturbing waves, the detecting stations are located below the zone of sharp velocity discontinuity. Seismic waves are then generated at a plurality of points at different distances from, but preferably colinear with the line of subsurface detecting stations. In this manner, the range covered by each seismic survey is greatly extended for a given amount of drilling for the foregoing location of the buried spread comprising the several subsurface stations.

While preferred embodiments of the invention have been described, it will be understood that further modifications may be made without departing from the spirit and scope of the invention as set forth in the appended claims.

What is claimed is:

1. A method of obtaining seismic data where there is a sharp change in the elastic constants in the strata adjacent the earth's surface without material change in the density of the material in such strata, which comprises exploring with seismic waves said strata to determine the range of depth in which said change in elastic constants occurs, generating seismic waves below said range of depth, detecting seismic waves at points deeper in the earth than where said change in elastic constants occurs, and recording said waves in correlation with time.

2. A method of seismic surveying, over an area of the earth's surface in which there is an absence of an unconsolidated surface layer and in which the surface layer is a consolidated material of substantially the same density throughout its depth and is in visible respects identical from top to bottom, said surface layer having the additional characteristic of a sharp velocity interface between the upper and lower faces thereof, which comprises exploring with seismic waves said layer to determine the locality of said velocity interface, at a shot point generating seismic waves at a location materially below said interface, detecting the seismic waves at a plurality of points separated one from the other and from said shot point and each located in said surface layer below said interface, and recording said detected waves in correlation with time.

3. A method of seismic surveying over an area of the earth's surface in which there is an absence of an unconsolidated surface layer and in which the surface layer is a consolidated material of substantially the same density throughout its depth and is in visible respects identical from top to bottom, said surface layer having the additional characteristic of a sharp velocity interface between the upper and lower faces thereof, which comprises seismically locating the depth of said interface below the upper face thereof, locating detecting stations below the depth of said interface and respectively separated one from the other along a traverse line, generating seismic waves at a location materially below said interface, simultaneously detecting seismic signals at each of said detecting stations and recording said signals in correlation with time.

CORNELIUS G. DAHM.

REFERENCES CITED

The following references are of record in the file of this patent:

UNITED STATES PATENTS

| Number | Name | Date |
| --- | --- | --- |
| 1,676,619 | McCollum | July 10, 1928 |
| 1,724,495 | McCollum | Aug. 13, 1929 |
| 2,074,161 | Bills | Mar. 16, 1937 |
| 2,151,878 | Weatherby | Mar. 28, 1939 |
| 2,156,198 | Scherbatskoy | Apr. 25, 1939 |
| 2,156,624 | Faust | May 2, 1939 |
| 2,167,124 | Minton | July 25, 1939 |
| 2,184,313 | Owen | Dec. 26, 1939 |
| 2,191,121 | Slichter | Feb. 20, 1940 |
| 2,192,972 | Innes | Mar. 12, 1940 |
| 2,202,885 | Zuschlag | June 4, 1940 |
| 2,340,272 | McCarty | Jan. 25, 1944 |
| 2,354,548 | Ricker | July 25, 1944 |
| 2,390,187 | Sharpe | Dec. 4, 1945 |